(12) United States Patent
Woodall, Jr.

(10) Patent No.: US 9,217,455 B1
(45) Date of Patent: Dec. 22, 2015

(54) QUICK RELEASE COLLAPSIBLE BOLT

(71) Applicant: Robert C. Woodall, Jr., Panama City, FL (US)

(72) Inventor: Robert C. Woodall, Jr., Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 93 days.

(21) Appl. No.: 13/907,541

(22) Filed: May 31, 2013

(51) Int. Cl.
*F16B 35/02* (2006.01)

(52) U.S. Cl.
CPC ..................... *F16B 35/02* (2013.01)

(58) Field of Classification Search
USPC .................................. 411/383–385
IPC ........................................ F16B 35/02
See application file for complete search history.

(56) References Cited

U.S. PATENT DOCUMENTS

| | | | | |
|---|---|---|---|---|
| 1,011,398 A * | 12/1911 | Andregg | ............ | 411/63 |
| 3,042,094 A * | 7/1962 | Liljeberg | ............ | 411/271 |
| 3,159,075 A * | 12/1964 | Bjork | ............ | 411/65 |
| 3,922,946 A * | 12/1975 | Grayson | ............ | 411/385 |
| 4,478,546 A * | 10/1984 | Mercer | ............ | 411/385 |
| 5,090,857 A * | 2/1992 | Dunn | ............ | 411/385 |
| 5,634,754 A * | 6/1997 | Weddendorf | ............ | 411/354 |
| 5,788,443 A * | 8/1998 | Cabahug | ............ | 411/385 |
| 8,342,787 B2 * | 1/2013 | Smith | ............ | 411/383 |
| 2002/0122712 A1 * | 9/2002 | Lin | ............ | 411/385 |

* cited by examiner

Primary Examiner — Gary Estremsky
(74) Attorney, Agent, or Firm — James T. Shepherd

(57) ABSTRACT

A quick release collapsible bolt utilizes a plurality of bolt segments that surround a removable central core. When the central core is in place, the bolt is used as a normal bolt that may screw into a nut or socket. The central, core can be pulled out when the bolt is attached to a nut to collapse the plurality of bolt segments so that the bolt segments then can be quickly withdrawn from the nut or receptacle without the need to unscrew the nut.

6 Claims, 1 Drawing Sheet

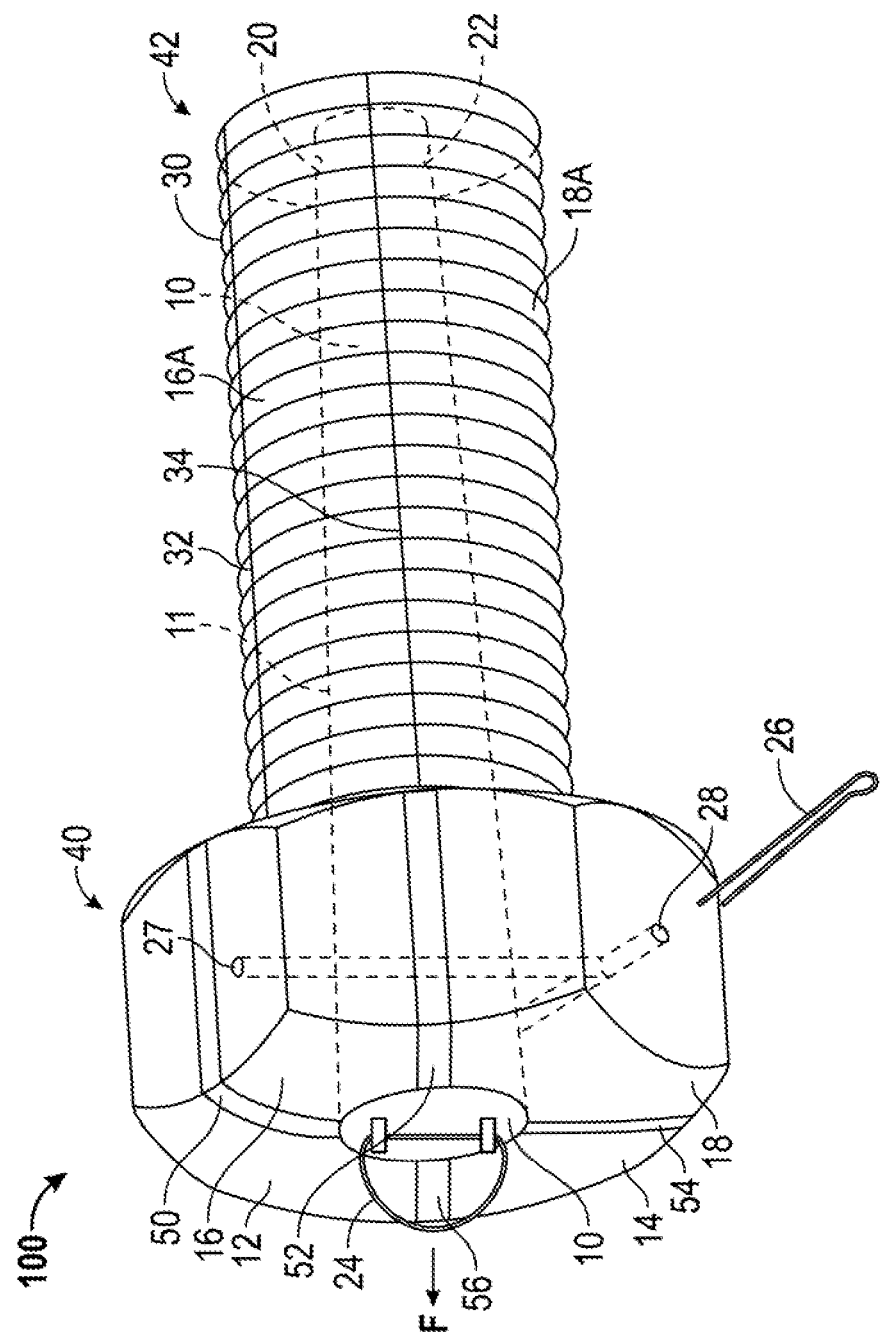

QUICK RELEASE COLLAPSIBLE BOLT

STATEMENT OF GOVERNMENT INTEREST

The invention described herein may be manufactured and used by or for the Government of the United States of America for governmental purposes without the payment of any royalties.

BACKGROUND OF THE INVENTION (1) Field of the Invention

The invention relates generally to fastener systems and more particularly to a quick release collapsible bolt apparatus and method.

(2) Description of the Prior Art

In general, the typical torque nut removal process involves two wrenches, one on the nut and one on the bolt working in opposition. In a twisting motion, the nut is ratcheted off the bolt and through a series of twists and 360 degree spins, the nut is eventually removed from the bolt. This is a time consuming process, particularly if there is a change from one configuration to another requiring disassembly and subsequent reassembly.

Recreational and work structures of some types are frequently torn down for movement to a new location. When many connections are utilized, a great deal of time could be saved if it were not required to undo each nut and bolt connection using the process discussed above.

Further, there are many situations in which time is of the essence when conducting maintenance, repair, and assembly applications, including disaster response, military operations, and various other contingency operations. It is therefore desirable that the ability to remove parts and hardware assemblies from one another be effected in a rapid manner, especially during combat operations in which personnel may be exposed to extreme hazards while performing this work.

The present invention comprises a new and improved quick release collapsible bolt that allows for clamping and fastening parts together in a conventional nut and bolt arrangement, while providing an improved release mechanism not requiring a traditional twisting or torquing of the nut and bolt with respect to each other. Accordingly, those of skill in the art will appreciate the present invention, which addresses the above-discussed problems.

SUMMARY OF THE INVENTION

It is an object of the present invention to provide a quick release collapsible bolt having a conventional manner to engage a fastener assembly, while providing an improved, faster removal process for the fastener.

Another object of the present invention is to provide a quick release collapsible bolt providing for a pull to release a central core element of a multi-part segmented bolt that collapses the sections to allow immediate removal of the bolt.

Still another object of the invention is to provide a quick release collapsible bolt and method which allows for a rapid means to release a nut and bolt from each other.

Other objects and advantages of the present invention will become apparent from the following descriptions, taken in connection with the accompanying drawings, wherein, by way of illustration and example, an embodiment of the present invention is disclosed. However, it will be understood that the present invention is not limited to the above and/or other objects of the invention.

In accordance with one embodiment of the present invention, a quick release collapsible bolt is disclosed which may comprise a plurality of bolt segments, each of the plurality of bolt segments comprising a bolt head portion and a threaded portion. The plurality of bolt segments are positioned adjacent to each other so that the threaded portion and bolt head portion of each of the plurality of bolt segments are in an aligned position, whereupon a receptacle is centrally formed between the plurality of bolt segments.

The quick release collapsible bolt may further comprise a center core comprising an elongate portion that extends into the receptacle through the bolt head portion and into the threaded portion of each of the plurality of bolt segments to support the plurality of bolt segments in the aligned position. The center core is removable from the bolt head portion whereupon the plurality of bolt segments are collapsible inwardly towards the receptacle.

In one embodiment, the elongate portion of the central core is tapered from a larger diameter near the bolt head portion to a smaller diameter within the plurality of bolt segments. The elongate portion of the central core may be substantially conical or frustoconical. In another embodiment, the elongate portion has a circular circumference.

In one embodiment, the quick release collapsible bolt further comprises an opening in the bolt head portion, and a fastener is insertable into the opening. The fastener is operable to hold the plurality of bolt segments and the center core together. In this embodiment, the fastener and the central core are removable in two steps: (1) the fastener is removed, and (2) the central core is removed, whereupon the plurality of bolt segments are collapsible inwardly towards the receptacle.

In yet another embodiment, a ball detent interconnection between the plurality of bolt segments and the center core may be operable to maintain the center core within the plurality of bolt segments. A removal force sufficient to overcome resistance of the ball detent interconnection permits a one-step removal of the central core whereupon the plurality of bolt segments are collapsible inwardly towards the receptacle. To assist in removing the central core, the central core may comprise a handle adjacent the bolt head portion.

In one embodiment, the central core may comprise radially extending segments that fit between the bolt head portion of each of the plurality of bolt segments.

In a preferred embodiment, the plurality of bolt segments comprises four bolt segments.

In another embodiment, the central core extends through an entire length of the threaded portion of each of the plurality of bolt segments.

BRIEF DESCRIPTION OF THE DRAWINGS

The FIGURE is a perspective view with internal components in dashed lines, which illustrates a quick release collapsible bolt in accordance with a preferred embodiment of the invention.

DETAILED DESCRIPTION OF THE INVENTION

In accordance with the preferred embodiment of the present invention, quick release collapsible bolt 100 is shown in the FIGURE. In this embodiment, quick release collapsible bolt 100 comprises segmented bolt quadrants 12, 14, 16, 18, and center core 10 when fully assembled. Each bolt quadrant comprises a threaded portion as indicated at 42 and a head portion as indicated at 40. Interfaces 32 and 34 are shown on the threaded portion 42 between quadrants of collapsible bolt 100. For example, interface 34 is an interface between the threaded portion of the bolt quadrants which are referred to in the FIGURE as 16A and 18A, and correspond to bolt quadrants 16 and 18.

While four quadrants are utilized in this embodiment, other numbers of bolt segments could be utilized rather than four quadrants depending on the bolt size. When assembled, quick release collapsible bolt 100 is in the form of a standard bolt with a bolt head portion 40 and a threaded shaft portion 42 that may be utilized with a standard nut or socket (not shown).

Center core 10 has a tapered elongate section indicated at interface 11 between core 10 and a rounded internal receptacle portion which extends longitudinally between core 10 and an interior of bolt quadrants 12, 14, 16, and 18. In other words, each bolt quadrant comprises an internal rounded receptacle portion, which engages core 10 along interface 11, which is the same shape to receive center core 10. In this embodiment, interface 11 between each bolt quadrant and core 10 is conical or frustoconical. However, other shapes could be used. While the preferred embodiment of interface 11 or shaft of center core 10 is conical or rounded, other shapes for center core and internal surfaces of the bolt quadrants might be utilized such as a tapered square or the like. Moreover, a taper is the preferred embodiment for reasons discussed hereinafter; but, a straight cylinder or square might also be utilized.

Center core 10 supports the four threaded bolt quadrants and pushes the quadrants outwardly so that the bolt quadrants take the shape of a standard bolt. Center core 10 preferably extends through the length of collapsible bolt 100. Center core 10 may also comprise nut head spacers 50, 52, 54, and 56, if desired, or may simply comprise the tapered section 11 without spacers in head portion 40. Each of the four bolt quadrants 12, 14, 16, and 18 are threaded with the desired threads 30 and fit together so that threads 30 are continuous as on a standard bolt. The type of threads may be selected so that once a nut is started on the assembled collapsible bolt 100, then any slight discrepancies in alignment of the thread will be reduced or eliminated. However, threads may be selected as desired and may be coarse or fine. Accordingly, when the bolt quadrants are placed in an aligned position, in which there may be slight discrepancies, the threads are still sufficiently aligned to screw into a nut.

For storage prior to use, collapsible bolt 100 may be wrapped in Teflon tape. If desired, the Teflon tape may be left in place during installation. In another embodiment, collapsible bolt 100 may be held together with cotter pin 26, that may be utilized in hole 28 or hole 27 or other holes as desired. The holes for cotter pin 26 are preferably formed in bolt head 40. Use of cotter pin 26, or if desired more than one cotter pin to hold the bolt components together, creates an additional step in the removal process but may be more convenient for holding the quick release bolt 100 components together. Other means for holding the threads together might comprise plastic thread protector material, plastic sockets, or the like.

In another embodiment, when cotter pin 26 is not used, then rounded or ball shaped elements may engage receptacles or detents such as 20 and 22 to hold the components in the desired alignment position so that the threads are aligned to be continuous or sufficiently continuous prior to starting the nut so that the nut will screw on as discussed hereinbefore.

In one embodiment, the taper of interface 11 between center core 10 and the interior of the bolt quadrants effectively creates a net upward and outward force when quick release collapsible bolt 100 is fully assembled. Center core 10 may be lubricated or pre-lubricated to facilitate sliding between the parts in the removal process, if desired. The interior surfaces of the bolt quadrants may smoothly engage center core 10. Thus, the taper enhances the ease of removing center core 10 by creating a force that enhances removal of core 10.

Handle 24 or a tab or the like may be provided at the top of core 10 which can be grabbed quickly with a pair of pliers or the like as discussed below for removal.

In operation, the assembled bolt is threaded through holes in the parts that are to be held together and a conventional nut is spun into place. Tightening the nut bolt pair happens in conventional fashion and the parts are held together. The quick release removal operation is quite simple. In one embodiment, which requires two steps, cotter pin 26 is released with a pair of pliers and then center core 10 is pulled out in the direction of the axis of center core 10 as indicated by force arrow F as shown. This allows bolt quadrants 12, 14, 16, and 18 to collapse inward disengaging the threads of the nut and allows all fastener elements to be rapidly removed and the parts separated.

In the one step removal method, where the fastener is not utilized, then central core 10 is pulled out in the same manner. In this method, due to the detent-ball connection, a predetermined removal force F must be exceeded to effect extraction. Accordingly, the bolt and nut are held securely together until the specified removal force F is applied. The detent-ball connection may be spring-loaded to provide for the predetermined force required for removal.

In summary, collapsible nut 100 is installed like a typical bolt. For quick removal, center core 10 is pulled out either with a sufficient force, if used, by first removing pin 26. The four quadrants 12, 14, 16, and 18 then collapse into the opening created after removal of center core 10.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A quick release collapsible bolt, comprising:
a plurality of three or more bolt segments, each of said plurality of bolt segments having a bolt head portion and a threaded portion, said plurality of bolt segments being positionable adjacent to each other so that said threaded portion and bolt head portion of each of said plurality of bolt segments are in an aligned position and form a hollow bolt having a receptacle centrally formed between said plurality of bolt segments so that in combination said bolt head portions combine to form an unthreaded bolt head at one end wherein said bolt head has a larger diameter than said threaded portion; and
a center core comprising an elongate portion that extends into said receptacle through said bolt head portion and into said threaded portion of each of said plurality of bolt segments to support said plurality of bolt segments in said aligned position, and radially extending segments that fit between adjacent said bolt head portions of said plurality of bolt segments at said bolt head, said center core being removable from said bolt head portion whereupon said plurality of bolt segments are collapsible inwardly towards said receptacle;

said central core forming a portion of said bolt head, said elongate portion of said central core being tapered from a larger diameter adjacent to said bolt head portions to a smaller diameter with distance away from said bolt head; and a handle extending from said central core at said bolt head on an opposite side of said bolt head than said threaded portion.

2. The quick release collapsible bolt of claim 1, wherein said elongate portion of said central core has a substantially conical shape.

3. The quick release collapsible bolt of claim 1, wherein said elongate portion has a circular circumference.

4. The quick release collapsible bolt of claim 1, further comprising an opening in at least one said bolt head portion, and a fastener insertable into said opening, said fastener being operable to hold said plurality of bolt segments and said center core together.

5. The quick release collapsible bolt of claim 1, wherein said plurality of bolt segments comprise four bolt segments.

6. The quick release collapsible bolt of claim 1, wherein said central core extends through an entire length of said threaded portion of each of said plurality of bolt segments.

\* \* \* \* \*